(12) United States Patent
Keränen

(10) Patent No.: US 12,467,746 B2
(45) Date of Patent: Nov. 11, 2025

(54) OPTICAL MEASUREMENT SYSTEM

(71) Applicant: LMI TECHNOLOGIES INC., Burnaby (CA)

(72) Inventor: Heimo Keränen, Oulu (FI)

(73) Assignee: LMI Technologies Inc., Burnaby (CA)

( * ) Notice: Subject to any disclaimer, the term of this patent is extended or adjusted under 35 U.S.C. 154(b) by 0 days.

(21) Appl. No.: 18/693,889

(22) PCT Filed: Mar. 15, 2023

(86) PCT No.: PCT/FI2023/050147
§ 371 (c)(1),
(2) Date: Mar. 20, 2024

(87) PCT Pub. No.: WO2024/189258
PCT Pub. Date: Sep. 19, 2024

(65) Prior Publication Data
US 2025/0244124 A1 Jul. 31, 2025

(51) Int. Cl.
*G01B 11/24* (2006.01)

(52) U.S. Cl.
CPC .................. *G01B 11/24* (2013.01)

(58) Field of Classification Search
CPC ...... G01B 11/24; G01B 11/2545; G01B 11/25
See application file for complete search history.

(56) References Cited

U.S. PATENT DOCUMENTS

| | | | |
|---|---|---|---|
| 6,707,027 B2 * | 3/2004 | Liess | G01P 3/366 345/157 |
| 9,677,869 B2 * | 6/2017 | Berkeley | G01N 21/01 |
| 2004/0119943 A1 | 6/2004 | Rathjen | |
| 2015/0260510 A1 | 9/2015 | Nakajima | |
| 2021/0152810 A1 | 5/2021 | Jensen et al. | |

* cited by examiner

*Primary Examiner* — Seung C Sohn
(74) *Attorney, Agent, or Firm* — Stoel Rives LLP

(57) ABSTRACT

The invention relates to a displacement sensor, for example as used in 3D sensors for measuring the three-dimensional shape of an object. A diffraction grating is used to reduce the angle of incidence of measurement light on a light sensor, such as an image sensor, thereby improving the performance of the light sensor. The displacement sensors of the present invention include sensors based on triangulation and coaxial sensors.

20 Claims, 6 Drawing Sheets

OPTICAL MEASUREMENT SYSTEM

RELATED APPLICATIONS

This application is a national stage under 35 U.S.C. § 371 of International Application No. PCT/FI2023/050147, filed Mar. 15, 2023, which is hereby incorporated by reference in its entirety.

TECHNICAL FIELD

The invention relates to a displacement sensor, for example as used in 3D sensors for measuring the three-dimensional shape of an object.

BACKGROUND

In many displacement and 3D profile sensors known in the art, light is projected onto a measurement object and light reflected from the surface of the measurement object is measured in order to determine the shape of the object. The angle of incidence of light on the image sensor in many such devices is offset from zero. Image sensors, such as CCDs and APSs, are not designed to operate at such angles and their performance deteriorates as a result. In triangulation-based devices, the angle of incidence can be reduced by increasing the triangulation angle; however, this strategy is limited by the physical constraints of the system, e.g. it is not possible to increase the triangulation angle to 90 degrees as sensor would occupy the same space as the measurement object. Furthermore, increasing the triangulation angle also has the undesirable side effect of increasing shadowing of the reflected light due to changes in the height of the measurement object. The greater the triangulation angle, the lower the change in height that cause shadowing. Furthermore, magnification leading to enlargement of the image causes further rotation of the intermediate image plane, further increasing the angle of incidence of light upon an image sensor if placed on the intermediate image plane, essentially preventing the use of such magnification which may otherwise be useful for improving accuracy of the sensor.

SUMMARY OF THE INVENTION

A first aspect of the invention relates to a sensor for measuring the displacement of the surface of a measurement object relative to the sensor. The sensor comprises:
- a light source configured to project measurement light in a measurement plane such that, when the sensor is in use, measurement light is reflected from the surface of the measurement object at the intersection of the surface of the measurement object with the measurement plane;
- first intermediate optics positioned along a first measurement axis and configured to focus measurement light reflected on a first side of the measurement plane in an intermediate image plane;
- second intermediate optics positioned along a second measurement axis and configured to focus measurement light reflected on a second side of the measurement plane in the intermediate image plane;
- at least one diffraction grating aligned with the intermediate image plane such that reflected measurement light is in focus on and incident upon the surface of the diffraction grating, and such that measurement light is diffracted along a third measurement axis;
- third intermediate optics positioned along the third measurement axis and configured to focus diffracted measurement light in a sensor image plane; and
- a light sensor aligned with the sensor image plane such that diffracted measurement light is in focus on the light sensor, wherein the light sensor is configured to measure the diffracted measurement light incident on the light sensor.

The angle of incidence of measurement light from the first measurement axis on the diffraction grating may be greater than the angle of diffraction of measurement light from the first measurement axis from the diffraction grating, and the angle of incidence of measurement light from the second measurement axis on the diffraction grating may be greater than the angle of diffraction of measurement light from the second measurement axis from the diffraction grating.

The measurement plane may be defined by the intersection of the plane of focus of the intermediate image plane via the first intermediate optics and the volume over which measurement light is projected along the measurement axis.

The plane of focus of the intermediate image plane via the second intermediate optics may be coplanar and overlapping the plane of focus of the intermediate image plane via the first intermediate optics.

The measurement light reflection on the first side of the measurement plane may be incident on a first portion of the diffraction grating, and the measurement light reflected on the second side of the measurement plane may be incident on a second portion of the diffraction grating.

The at least one diffraction grating may comprise two diffraction gratings, the first portion of the at least one diffraction grating may be provided by a first diffraction grating and the second portion of the at least one diffraction grating may be provided by a second diffraction grating.

Light diffracted from the first portion of the diffraction grating may be focused on a first portion of the light sensor, and light diffracted from the second portion of the diffraction grating may be focused on a second portion of the light sensor.

The first portion of the diffraction grating and second portion of the diffraction grating may not overlap.

The first portion of the light sensor and second portion of the light sensor may not overlap.

The first measurement axis may be offset from the projection axis by a first triangulation angle, and the second measurement axis may be offset from the projection axis by a second triangulation angle.

The first triangulation angle may be the same as the second triangulation angle.

The first triangulation angle and second triangulation angle may be different.

The wavelength or range of wavelengths of the light source, the pitch of rulings or slits of the diffraction grating, and the first triangulation angle and second triangulation angle may be configured such that the third measurement axis is perpendicular to diffraction plane.

The first intermediate optics may comprise a first subset, a first specular reflector, and a second subset arranged such that measurement light reflected on the first side of the measurement plane enters the first subset of the first intermediate optics, exits the first subset first intermediate optics, is reflected by the first specular reflector at a first angle of reflection, enters the second subset first intermediate optics, and exits the second subset first intermediate optics such that the measurement light is in focus in the intermediate image plane.

The second intermediate optics may comprise a first subset, a second specular reflector, and a second subset arranged such that measurement light reflected on the second side of the measurement plane enters the first subset of the second intermediate optics, exits the first subset of the second intermediate optics, is reflected by the second specular reflector at a second angle of reflection, enters the second subset of the second intermediate optics, and exits the second subset of the second intermediate optics such that the measurement light is in focus in the intermediate image plane.

The magnification powers of the first subset of the first intermediate optics, the second subset of the first intermediate optics, the first subset of the second intermediate optics, and the second subset of the second intermediate optics, the first angle of reflection, and the second angle of reflection may be configured such that the plane of focus of the intermediate image plane via the second intermediate optics is coplanar and overlapping the plane of focus of the intermediate image plane via the first intermediate optics.

The first intermediate optics and second intermediate optics may be arranged with mirror symmetry about the measurement plane.

The light source may further comprise optical elements for forming projecting light in the measurement plane.

The light source may be configured to project a line of light extending across the measurement plane onto the measurement object.

The light source may be configured to project one or more points of light onto the measurement object.

The light source may be a laser or LED.

The light sensor may be an image sensor, such as a charge-coupled device or active pixel sensor.

The light sensor may be positioned such that the angle of incidence of measurement light diffracted on the light sensor is essentially zero.

The angle of diffraction of measurement light from the diffraction grating may be essentially zero.

One or both of the first intermediate optics and second intermediate optics may have a magnification power of magnitude other than 1.

In this context, "essentially zero" may mean that the magnitude of the angle is less than 5 degrees.

The diffraction grating may be a transmissive diffraction grating, or the diffraction grating may be a reflective diffraction grating.

The diffraction grating may be a curved diffraction grating, wherein the curvature of the diffraction grating is the same as a curvature of the intermediate image plane.

The sensor may be configured to identify a local light intensity maximum on the light sensor and calculate the distance to the surface of the measurement object based on the location of local light intensity maximum.

The sensor may be configured to measure the reflectivity of the surface of the measurement object based on the magnitude of the corresponding local intensity peak.

The sensor may be configured to identify multiple local light intensity maxima on the light sensor, each local light intensity maximum corresponding to the reflection of measurement light from a transparent layer of the measurement object, and calculate the distance to the each transparent layer of the measurement object based on the locations of local light intensity maxima.

A second aspect of the invention relates to a sensor for measuring the displacement of the surface of a measurement object relative to the sensor. The sensor comprises:

a light source configured to project measurement light along a projection axis and in a measurement plane such that, when the sensor is in use, measurement light is reflected from the surface of the measurement object at the intersection of the surface of the measurement object with the measurement plane;

first intermediate optics positioned along a first measurement axis and configured to focus measurement light reflected from the measurement plane in an intermediate image plane, wherein the first measurement axis is coaxial with the projection axis;

a diffraction grating aligned with the intermediate image plane such that the reflected measurement light is in focus on and incident upon the surface of the diffraction grating and such that measurement light is diffracted along a second measurement axis;

second intermediate optics positioned along the second measurement axis and configured to focus the diffracted measurement light in a sensor image plane; and a light sensor aligned with the sensor image plane such that diffracted measurement light is in focus on the light sensor, wherein the light sensor is configured to measure the diffracted measurement light incident on the light sensor.

The angle of diffraction of measurement light from the diffraction grating may be smaller than the angle of incidence of measurement light on the diffraction grating.

The diffraction grating may be coplanar with the measurement plane.

The diffraction grating may be a Ronchi ruling.

The diffraction grating may operate in both reflective and transmissive modes.

The thickness of the diffraction grating may be less than 500 μm.

The diffraction grating may be further configured to diffract measurement light along a third measurement axis, the third measurement axis being coaxial with the second measurement axis and extending from the opposite side of the diffraction grating, and the sensor may further comprise:

third intermediate optics positioned along the third measurement axis and configured to focus the diffracted measurement light in a second sensor image plane; and a second light sensor aligned with the second sensor image plane such that diffracted measurement light is in focus on the second light sensor, wherein the second light sensor is configured to measure the diffracted measurement light incident on the sensor light sensor.

The sensor may further comprise:

a second diffraction grating positioned such that the first diffraction grating and second diffraction grating are mirror symmetric about the measurement plane;

at least one reflector configured to reflect measurement from a first side of the measurement plane onto the first diffraction grating and to reflect measurement light from a second side of the measurement plane onto the second diffraction grating.

The second intermediate optics may be configured to focus the light diffracted from the first diffraction grating and light diffracted from the second diffraction grating in the sensor image plane.

The optical path length between the measurement plane and the light sensor for measurement light from the first side of the measurement plane may be the same as the optical path length between the measurement plane and the light sensor for measurement light from the second side of the measurement plane.

The second intermediate optics may further comprise a beam combiner for combining measurement light from the first side of the measurement plane and measurement light from the second side of the measurement plane such that measurement light from both sides of the measurement plane is incident on the light sensor.

Measurement light from the first side of the measurement plane may be incident on a first portion of the light sensor, and measurement light from the second side of the measurement plane may be incident on a second portion of the light sensor.

The first portion of the light sensor and second portion of the light sensor may be different and non-overlapping portions of the light sensor.

The light source may further comprise optical elements for forming projecting light in the measurement plane.

The light source may be configured to project a line of light extending across the measurement plane onto the measurement object.

The light source may be configured to project one or more points of light onto the measurement object.

The light source may be a laser or LED.

The light sensor may be an image sensor, such as a charge-coupled device or active pixel sensor.

The light sensor may be positioned such that the angle of incidence of measurement light diffracted on the light sensor is essentially zero.

The angle of diffraction of measurement light from the diffraction grating may be essentially zero.

One or both of the first intermediate optics and second intermediate optics may have a magnification power of magnitude other than 1.

In this context, "essentially zero" may mean that the magnitude of the angle is less than 5 degrees.

The diffraction grating may be a transmissive diffraction grating, or the diffraction grating may be a reflective diffraction grating.

The diffraction grating may be a curved diffraction grating, wherein the curvature of the diffraction grating is the same as a curvature of the intermediate image plane.

The sensor may be configured to identify a local light intensity maximum on the light sensor and calculate the distance to the surface of the measurement object based on the location of local light intensity maximum.

The sensor may be configured to measure the reflectivity of the surface of the measurement object based on the magnitude of the corresponding local intensity peak.

The sensor may be configured to identify multiple local light intensity maxima on the light sensor, each local light intensity maximum corresponding to the reflection of measurement light from a transparent layer of the measurement object, and calculate the distance to the each transparent layer of the measurement object based on the locations of local light intensity maxima.

A further aspect of the invention relates to a method for measuring the displacement of the surface of a measurement object relative the sensor of any preceding claim. The method comprises identifying a local light intensity maximum on the light sensor and calculating the distance to the surface of the measurement object based on the location of local light intensity maximum.

A further aspect of the invention relates to a method for measuring the thickness of a transparent film. The method comprises projecting measurement light onto the transparent film using any of the sensors described above and determining the distance on the light sensor between at least two intensity maxima caused by the reflection of the measurement light from the surfaces of the transparent film.

A further aspect of the invention relates to a 3D sensor comprising any of the sensors described above.

A further aspect of the invention relates to a method for measuring the three-dimensional shape of a measurement object. The method comprises repeatedly measuring the two-dimensional profile of the measurement object with the 3D sensor described above at different positions on the measurement object and generating output data comprising the plurality of measured two-dimensional profiles and the displacements between the measured two-dimensional profiles.

A further aspect of the invention relates to a method for generating a three-dimensional model of a measurement object. The method comprising measuring the three-dimensional shape of the measurement object according to the method for measuring the three-dimensional shape of a measurement object described above and processing the plurality of measured two-dimensional profiles of the measurement object and displacements between the measured two-dimensional profiles to generate the three-dimensional model of the measurement object.

BRIEF DESCRIPTION OF THE DRAWINGS

FIG. 1A A perspective drawing illustrating part of the sensor of FIG. 1.

DETAILED DESCRIPTION

Figure 1:
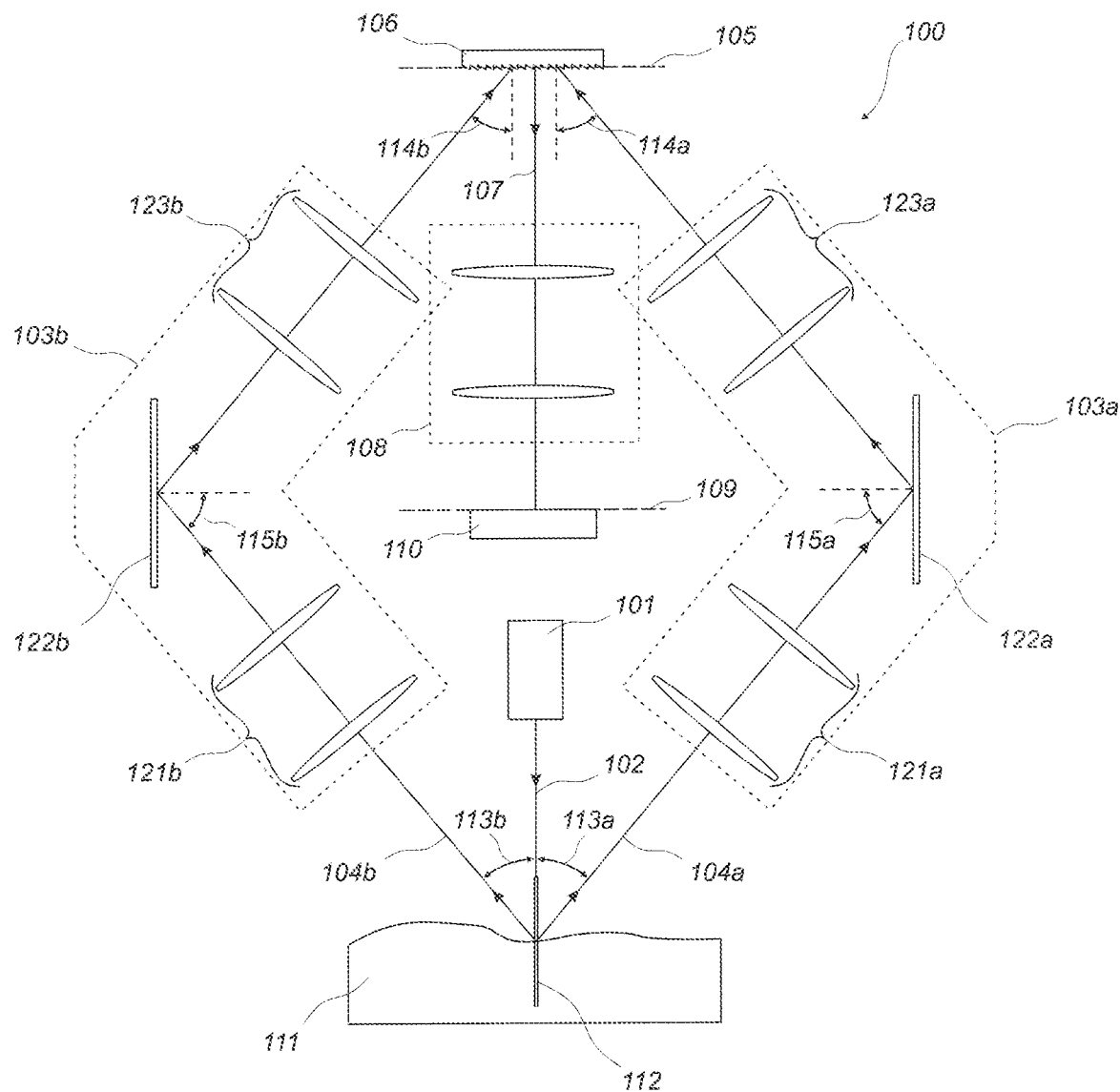
FIG. 1A schematic drawing of a sensor according to a first embodiment of the invention.
FIG. 1B A schematic drawing of the angles of incidence and diffraction from a diffraction grating in the sensors of the present invention.

The term "sensor" as used here means an individual element or a larger system that outputs a signal corresponding to a property of a measured state of an object or environment. For example an optical sensor such as a CCD (charge-coupled device) or APS (active pixel sensor) may be used to measure light, in particular images, incident upon the sensors, while a compound sensor, such as a three dimensional profile measurement sensor, may include a sensor such as a CCD or APS while also including other elements such as optics and light sources that are used in conjunction with the CCD or APS.

Throughout the description below, the terms "perpendicular", "essentially perpendicular", "zero-angle" and "essentially zero-angle" have been used to refer to the alignment of different optical elements relative to optical axes, vectors, and other optical elements. It will be appreciated that "perpendicular" and "zero-angle" are impossible to achieve in practice and represent and idealised version of the system and depicted in the schematic drawings described below. The terms "essentially perpendicular" and "essentially zero-angle" have been used to reflect this reality. Where such terms and phrases are used, the intended scope of these terms is broader than the strict idealised meaning. Both "perpendicular" and "essentially perpendicular" preferably mean an angle of 90±1 degrees, but may also include angles of 90±2, 3, 4, 5, or 10 degrees. Both "zero-angle" and "essentially zero-angle" or other similar terms preferably mean an angle of 0±1 degrees, but may also include angles of 0±2, 3, 4, 5, or 10 degrees.

The term "to image" as used herein means to measure the light received at a sensor, in particular to measure the intensity of light received at each pixel or other unit of the sensor.

The term "light sensor" as used herein means a sensor capable of measuring the intensity of light received at different positions on its surface.

For the avoidance of doubt, the optical systems depicted in the drawings are schematic in nature and the relative sizes and shapes of optical elements such as lenses should not be seen a limiting on the optical elements used to implement the present invention.

FIG. 1 shows a schematic representation of sensor 100 according to a first embodiment of the invention.

The sensor 100 measures the displacement of the surface of the measurement object 111 within a measurement plane 112 by measuring light reflected from the measurement object 111 at the intersection of the surface of measurement object 111 and the measurement plane 112. For the avoidance of doubt, the measurement object 111 is not part of the sensor of the present invention. The measurement plane is depicted and described in more detail with respect to FIG. 1A.

The sensor 100 includes a light source 101, such as a laser or light emitting diode, although any suitable light source may be used. Preferably, the spectral bandwidth of the light source is limited such that the range of angles of diffraction of light from the diffraction grating 106, explained in more detail below, is equal to or smaller than the range of angles over which the third intermediate optics 108 can accept light. This limitation is optional but increases the intensity of measurement light received at the sensor 110 for a given power output of the light source 101, resulting in a more energy efficient sensor.

The light source emits measurement light along a projection axis 102. For example, light emitted from the light source 101 may be projected across a plane and thereby project a line of light onto to measurement object 111. However, light emitted from the light source 101 onto the measurement object 111 may take any suitable form from which the profile can be reconstructed, such as a series of dots (i.e. a dotted line), a series of smaller lines (i.e. a dashed line) or any combination of the two, as long as the two-dimensional shape of the intersection of the measurement object 111 and the measurement plane 112 can be reconstructed from the projected light. The principles of the present invention are also applicable to a sensor using only a single point of light.

Figure 1A:
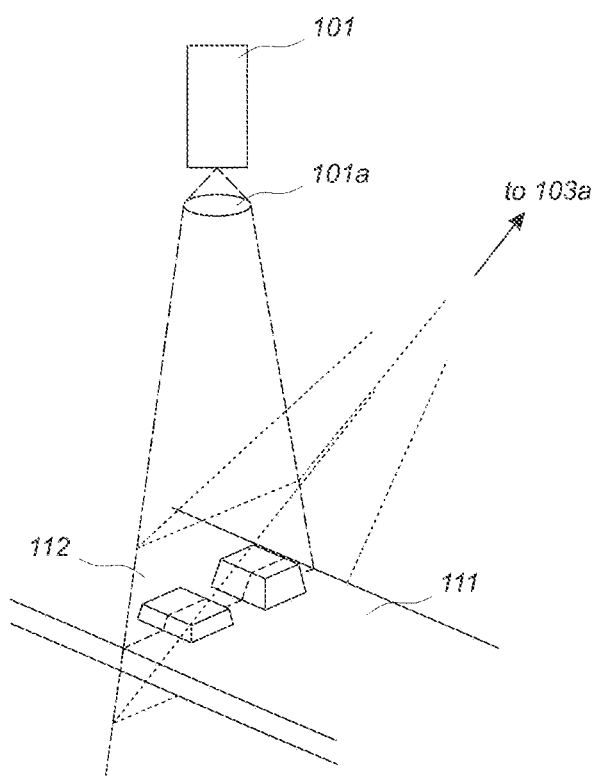

The arrangement of the light source 101 and measurement plane 112 are shown in more detail in FIG. 1A. FIG. 1A is a perspective drawing showing some of the same elements as FIG. 1. The light source 101 emits measurement light which is formed into the appropriate shape by optical elements 101a and is projected across the measurement object 111. While FIG. 1A shows that the measurement light is projected across the whole measurement object, this is not essential, nor is it essential for the measurement object to occupy the full width of the measurement light. Where the measurement light is incident upon the measurement object 111, it is reflected from the measurement object 111 and appears as a line on the measurement object. In theory, the measurement plane 112 is defined by the overlap between the plane of focus of the intermediate image plane 105 (shown in FIG. 1) via the first intermediate optics 103a, the plane of focus of the intermediate image plane 105 via the second intermediate optics 103b, and the plane in which measurement light is projected. In practice, light is projected in a three-dimensional volume with a small depth, rather than an idealised two-dimensional plane. The measurement plane 112 is thus defined as the overlap between this three-dimensional volume in which measurement light is projected and the plane of focus of the intermediate image plane 105 via the first intermediate optics 103a and the plane of focus of the intermediate image plane 105 via the second intermediate optics 103b. Where light is reflected from the surface of the measurement object 111 within the measurement plane 112, it is measured in order to ultimately determine the displacement of the surface of the measurement object 111 relative to the light source, or to determine the thickness of the measurement object 111, where the measurement object is a transparent film.

Returning to FIG. 1, a projection axis 102 is defined by the idealised direction along which light is emitted from the light source 101. Light projected onto the surface of the measurement object 111 by the light source 101 is reflected, specularly or non-specularly, from the surface of the measurement object 111 in multiple directions, i.e. by diffuse reflection, also referred to as non-specular reflection or scattering. Some of the reflected light enters first intermediate optics 103a, located on a first measurement axis 104a. The first measurement axis 104a is offset from the projection axis 102 by a triangulation angle 113a. The first intermediate optics 103a are configured to focus the projected measurement light reflected from the surface of the measurement object 111 in an intermediate image plane 105. According to the Scheimpflug principle, since the measurement plane 112 is offset from the lens angle of the first intermediate optics 103a by an angle corresponding to the first triangulation angle 113a, the image plane of the measurement plane formed by the first intermediate optics 103, i.e. the intermediate image plane 105, is also offset from the lens plane of the first intermediate optics. The size of the angular offset of the intermediate image 105 with the first measurement axis 104a therefore depends on the first triangulation angle 113a and the magnification power of the first intermediate optics 103a.

The first intermediate optics 103a are made up of a first subset of the first intermediate optics 121a, a first specular reflector 122a and a second subset of the first intermediate optics 123a. Part of the measurement light reflected from the surface of the measurement object 111 enters the first subset of the first intermediate optics 121a, is reflected by the specular reflector 122a and enters the second subset of the first intermediate optics 123a. Light exiting the second subject of the first intermediate optics 123a is incident upon the diffraction grating 106.

If an image sensor were simply placed on the intermediate image plane 105 to measure the light reflected from the measurement object 111, light incident on the image sensor is received at the intermediate image plane angle 114. However, image sensors, such as CCDs and APSs, are generally not designed to operate at oblique angles and their performance deteriorates as a result. Even for simpler light sensors, such as position sensitive devices, performance decreases as the angle of incidence increases. The angle of incidence 114a of light at the intermediate image plane 105 can be reduced by increasing the triangulation angle; however, this strategy is limited by the physical constraints of the system, e.g. it is not possible to increase the triangulation angle to 90 degrees as the first intermediate optics 103a and intermediate image plane 105 would occupy the same space as the measurement object 111. Furthermore, increasing the triangulation angle also has the undesirable side effect of increasing shadowing of the reflected light along the first measurement axis 10a4 due to changes in the height on the surface profile of the measurement object in a direction perpendicular to the measurement plane. The greater the triangulation angle, the lower the change in height that cause shadowing. Furthermore, magnification of the image causes further rotation of the intermediate image plane, further increasing the angle of incidence of light upon an image or other light sensors if placed on the intermediate image plane, essentially preventing the use of magnification which may otherwise be useful for improving accuracy of the sensor.

The sensors of the present invention solve these problems by employing one or more diffraction gratings to change the angle of propagation of the light relative to the image plane 105, such that an light sensor can be used at a smaller angle, thereby increasing its performance.

In the embodiment depicted in FIG. 1, a diffraction grating 106 is aligned with the intermediate image plane 105 such that the measurement light reflected from the surface of the measurement object 111 is incident upon and in focus on the surface of the diffraction grating 106, i.e. the surface of the diffraction grating 106 is aligned with the intermediate image plane 105. In some embodiments the diffraction grating 106 is a planar diffraction grating. In other embodiments the diffraction grating 106 may have slight curvature to account for deformation of the image plane 105 due to non-ideal properties of the first intermediate optics 103. In the embodiment of FIG. 1, the diffraction grating 106 is a reflective diffraction grating, but it will be appreciated that a transmissive diffraction grating may alternatively be used.

A diffraction grating with ruling or slit pitch d(also referred to as ruling or slit separation) diffracts light of wavelength/incident at an angle $\theta_i$ at a diffraction angle $\theta_m$ according to the grating equation $d(\sin \theta_i - \sin \theta_m) = \pm m\lambda$, where m is the mode number $m \in \mathbb{N} = \{0, 1, 2, 3 \ldots \}$. The angle of incidence $\theta_i$ and angles of diffraction $\theta_m$ are defined in opposite directions relative to a plane parallel to the diffraction grating's rulings or slits and extending perpendicular to the planar surface of the diffraction grating, also referred to as the grating normal.

Exemplary values of angles of incidence $\theta_i$ and angles of diffraction in the m=1 mode $\theta_1$ for a grating with 1800 lines mm$^{-1}$ and light of different wavelengths λ in the blue region of the visible wavelength of light are provided in Table i. It can be seen that light with a wavelength of around 450 nm has an angle of diffraction of close to zero when the angle of incidence is 54 degrees, i.e. when the triangulation angle 113 and intermediate image plane angle 114 are 36 degrees (assuming that the first intermediate optics 103 has a magnification power of one). Such a large angle has a significant effect on the performance of a light sensor if placed at the intermediate image plane 105.

TABLE i

| λ (nm) | $\theta_i$ (°) | $\theta_1$ (°) |
|---|---|---|
| 446 | 34 | −14, 1 |
|  | 54 | 0, 4 |
|  | 84 | 11, 1 |
| 448 | 34 | −14, 3 |
|  | 54 | 0, 2 |
|  | 84 | 10, 8 |
| 450 | 34 | −14, 5 |
|  | 54 | −0, 1 |

TABLE i-continued

| λ (nm) | $\theta_i$ (°) | $\theta_1$ (°) |
|---|---|---|
|  | 84 | 10, 6 |
| 452 | 34 | −14, 7 |
|  | 54 | −0, 3 |
|  | 84 | 10, 4 |
| 453 | 34 | −14, 8 |
|  | 54 | −0, 4 |
|  | 84 | 10, 3 |

Figure 1B:
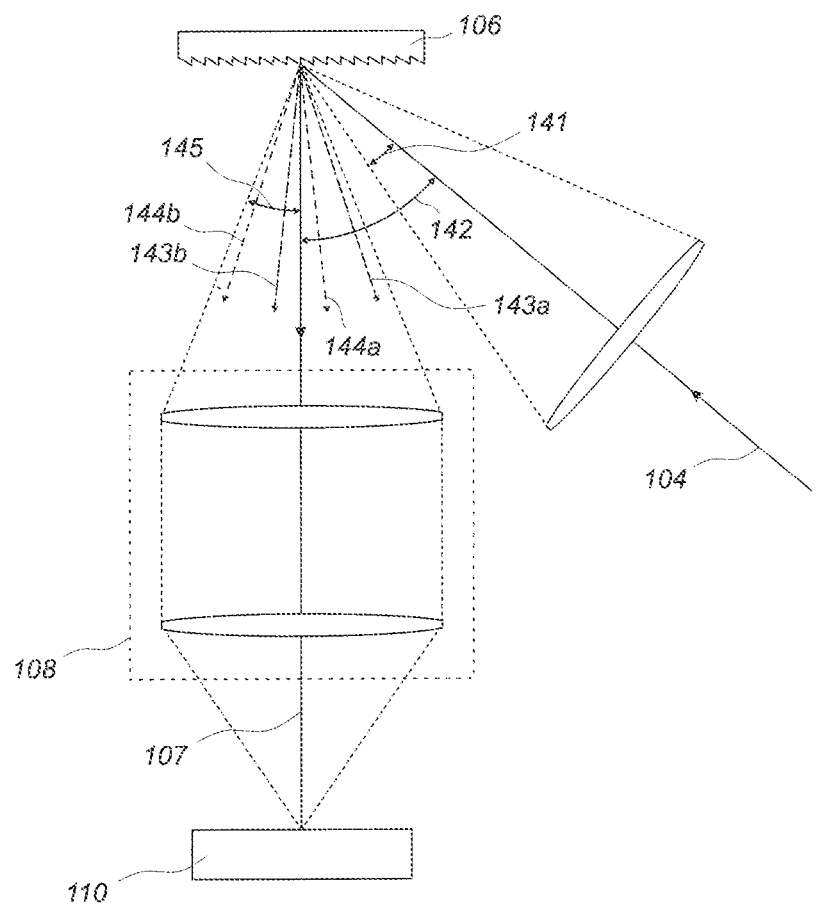

The diffraction of light reflected from the surface of the measurement object 111 is shown in more detail in FIG. 1B. Angle 141 is the maximum half-angle of light from the measurement plane exiting the first intermediate optics 103a and in-focus on the surface of the diffraction grating 106. Angle 143-142 is the difference between the first measurement axis 104 and the third measurement axis 107. Arrows 143a and 143b show the minimum and maximum angles of diffraction for measurement light of a first wavelength. Angles 144a and 144b show the minimum and maximum angles of diffraction for measurement light of a second wavelength. As an example, where the half-angle 141 is 20 degrees, and the angle 142 between the first and second measurement axes is 60 degrees, then the angle of diffraction in the first diffraction mode (i.e. m=1) of light of wavelength 400 nm from the diffraction grating with 1800 lines mm-1 along arrow 143a, i.e. with an angle of incidence of 40 degrees, is-15.4 degrees and along arrow 143b, i.e. with an angle of incidence of 80 degrees, is 4.4 degrees. For light of wavelength 500 nm, the angle of diffraction in the first diffraction mode (m=1) from the same grating over the same range of input angles along arrow 144a (angle of incidence 40 degrees) is-4.9 degrees and along arrow 144b (angle of incidence 80 degrees) is 14.9 degrees. Thus, in this example, if the third intermediate optics 108 has input cone half-angle 145 of 15.4 degrees, all light in-focus on the diffraction grating between 400 nm and 500 nm will enter the third intermediate optics 108 and ultimately be incident upon the light sensor 110. It can therefore be seen that limiting the spectral bandwidth of the light source 101 to wavelengths that will be diffracted from the diffraction grating at angles within the input cone of the third intermediate optics 108 leads to improved efficiency of the device, since the maximum amount of measurement light that is emitted from the light source is incident upon the light sensor 101. However, it will be understood that this is not an essential feature of the invention, and broader or narrower spectral wavelengths may be used with the sensor of the present invention.

Furthermore, a non-specular reflector may be used instead of a diffraction grating 106 in the intermediate image plane 105. However, the use of a properly aligned and configured diffraction grating increases the intensity of light propagating along the second measurement axis compared to a non-specular reflector, such as a flat diffusive reflector.

Returning to FIG. 1, a second measurement axis 104b extends from the opposite side of the measurement plane 112, and second intermediate optics 103b are arranged along the second measurement axis 104b as described above with respect to the first intermediate optics 103a and first measurement axis 104a. Like the first intermediate optics 103a, second intermediate optics 104b are configured to focus light reflected from the measurement plane 112 in the intermediate image plane 105, i.e. on the surface of diffraction grating 106. The description above of the first intermediate optics 103a and the configuration of elements along the first measurement axis 104a applies equally to the second intermediate optics 103b and the configuration of elements along the second measurement axis 104b.

While the configuration shown in FIG. 1 is presented with mirror symmetry, it is not essential that the first intermediate optics 103a and second intermediate optics 103b have such symmetry. By arranging the first intermediate optics 103a and second intermediate optics 103b with mirror symmetry, the structure and manufacture of the sensor is simplified; however, the only necessary constraint is that image planes of the measurement plane via each of the first intermediate optics 103a and second intermediate optics 103b, in which measurement light received from the measurement plane 112 is in focus, are coplanar with each other and the surface of the diffraction grating 106. Indeed, it may be advantageous to employ a configuration that is not symmetrical, i.e. where the first triangulation angle 113a differs from the second triangulation angle 113b. This may be achieved by modifying the magnification powers of the first subset 121b of the second intermediate optics 103b and second subset 123b of the second intermediate optics 103b in comparison with the magnification powers of the corresponding subsets in the first intermediate optics 103a.

Light focused onto the diffraction grating 106 by the first intermediate optics 103a may be incident on a first portion of the diffraction grating and light focused onto the diffraction grating 106 by the second intermediate optics 103b may be incident on a second portion of the diffraction grating. The first and second portions of diffraction grating 106 may be non-overlapping, which allows the image of the measurement plane formed on the diffraction grating from each side of the measurement plane to be easily distinguished.

It will be appreciated that while a single diffraction grating 106 is referred to here and depicted in FIG. 1, where light focused by the first intermediate optics 103a and second intermediate optics 103b are incident on distinct portions of the diffraction grating, the function of diffraction grating 106 may be performed by two separate diffraction gratings that are aligned with the intermediate image plane 105.

Where multiple diffraction gratings are used in place of the single diffraction grating 106, each diffraction grating may have a different pitch, thereby changing the angles of diffraction for light incident at a given angle. Thus, a different triangulation angle 113b or different magnification power in the second intermediate optics 103b may be used while still allowing light diffracted from the two gratings to propagate essentially parallel to one another and therefore be in focus on the light sensor 110 when using a single light sensor 110.

As mentioned above with respect to FIG. 1B, measurement light diffracted by the diffraction grating 106 enters third intermediate optics 108, located on a third measurement axis 107. The third measurement axis 107 is preferably essentially perpendicular to the surface of the diffraction grating 106, i.e. essentially parallel with the grating normal. In this context, "essentially parallel" means within five degrees of perpendicular. Similarly, "essentially coaxial" means within five degrees of parallel. When the third measurement axis 107 is essentially perpendicular to the surface of the diffraction grating, performance of the light sensor 110 is improved, as described above, and light diffracted from the diffraction grating from both the first side of the measurement plane (i.e. along first measurement axis 104a) and the second side of the measurement plane (i.e. along the second measurement axis 104b) can be in-focus across the light sensor 110.

Third intermediate optics 108 are configured to focus the diffracted light from the diffraction grating 106 onto a sensor image plane 109. Since the image of the light projected onto the measurement object 111 is in focus in the intermediate image plane 105, i.e. on the diffraction grating 106, then according to the Scheimpflug principle, the angle of the sensor image plane 109 relative to the third measurement axis 107 is the same as the angle of the intermediate image plane 105 relative to the third measurement axis 107, when the magnification power of the third intermediate optics is one.

Light sensor 110 is positioned such that its active surface is aligned with the sensor image plane 109 and the diffracted measurement light is in focus across the light sensor 110.

Where light reflected on the first side of the measurement plane 112 and reaching the diffraction grating 106 via the first intermediate optics 103a is incident on a first portion of the diffraction grating, and light reflected on the second side of the measurement plane 112 and reaching diffraction grating 106 via the second intermediate optics 103b is incident on a second portion of the diffraction grating, the light reflected on each side of the measurement plane 112 is ultimately incident on the light sensor 110 in a first portion and a second portion as well. Consequently, light sensor 110 may also be replaced by two separate light sensors corresponding to the first portion and the second portion. However, the use of a single light sensor, like the use of a single diffraction grating, significantly simplifies the construction and calibration of the sensor 100.

The light sensor may be an image sensor such as a CCD (charge coupled device) or APS (active pixel sensor), a position sensitive device or any suitable sensor capable of measuring the intensity of light received at different positions on its surface.

If the third measurement axis 107 is essentially parallel to the grating normal, then arbitrary magnification can be used in the second intermediate optics 108 without changing the angle of the sensor image plane 109. Magnification may allow for more accurate measurement of the shape of the light projected onto the measurement object 111. Furthermore, since the performance of the light sensor 110 is not constrained anymore by the triangulation angle 113a/113b, a smaller triangulation angle 113a/113b can be used, allowing the sensor 100 to measure the shape of measurement objects 111 with higher aspect ratio surface features without shadowing.

Furthermore, other diffraction modes than the m=1 mode may be used. The m=−1 mode provides the same intensity of diffracted light as the m=1 mode and may therefore be used with the same preference as the m=1 mode. Light diffracted in modes higher than m=±1 has lower intensity but may still be used in the manner described above and is still preferable to the use of a simple diffuse reflector instead of a diffraction grating. In order to maximise the intensity of diffracted light, a blazed diffraction grating may be used, in which case the light source 101 may be a monochromatic or narrow band light source with a central wavelength equal to the blaze wavelength of the diffraction grating.

Furthermore, the diffraction grating 106 may be curved. In practice, the image plane 105 may be slightly curved due to the non-ideal properties of first intermediate optics 103, particularly where lower-quality lenses are used. The curvature of the diffraction grating 106 is preferably the same as the curvature of the image plane 105, such that the light received from the measurement plane 112 is in focus at every point on the diffraction grating 106 where it is incident.

In the simplest example, in which a single point of light is projected onto the surface of the measurement object 111, measurement light received from each side of the measurement plane 112 is incident on the light sensor 110. The position of the maximum light intensity on the light sensor 110 in the light from each side of the measurement plane corresponds to the displacement of the illuminated point on the surface of the measurement object 111 relative to the sensor 100. Where other light sources are used, such as a series of points, the position of local maxima of light intensity correspond to the displacements of each illuminated point on the surface of the measurement object 111 relative to the sensor. Where a line of light is used, the maximum intensity in each column or row of pixels corresponds to the displacement of an illuminated region on the surface of the measurement object 111 relative to the sensor 100.

Figure 2:
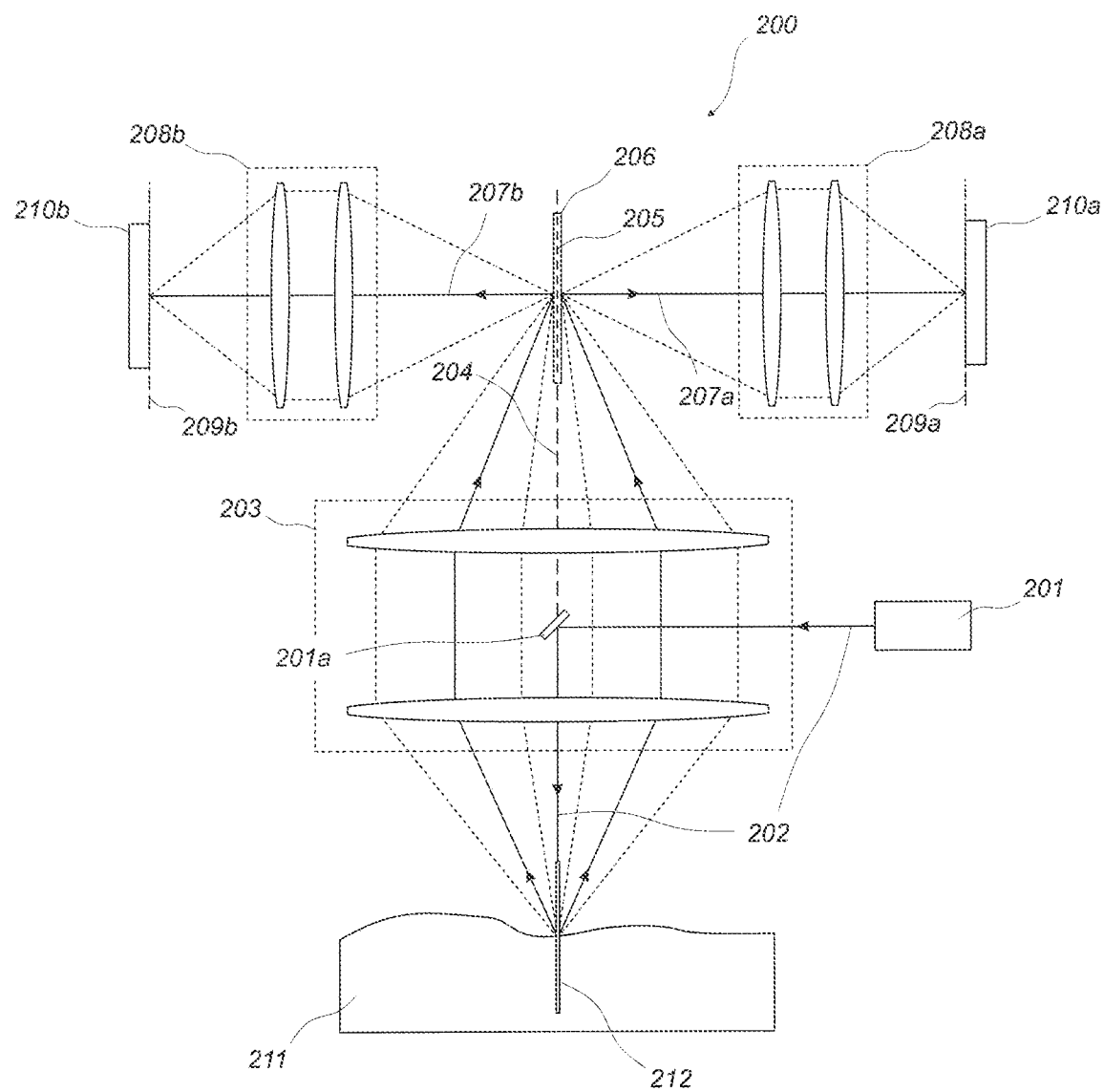
FIG. 2A schematic drawing of a sensor according to a second embodiment of the invention.

FIG. 2 shows a sensor 200 according to a second embodiment of the present invention. Like the sensor 100, the sensor 200 uses a diffraction grating 206 to enable an essentially zero angle of incidence of light upon the light sensor 210. However, unlike the triangulation sensor 100 described above, sensor 200 is a coaxial sensor, i.e. the first measurement axis 204 is coaxial with the projection axis 202, in other words the first measurement axis 204 lies within the measurement plane 212.

The sensor 200 includes a light source 201 as described above with respect to sensor 100. The light source 201 may include one or more optical elements, either integrally as part of the light source 201 or arranged along the axis along a projection axis 202 in the path of light emitted from the light source 201. Measurement light may be projected onto the measurement object such that a line of light is projected onto the measurement object 211. However, light emitted from the light source 201 in the measurement plane 212 onto the measurement object 211 may take any suitable form of light as described as above with respect to sensor 100. The spectral bandwidth of the light source 202 of FIG. 5, and that of the other coaxial embodiments described below, may be limited based on the half-angle of the cone of light entering second intermediate optics, as described above with respect to FIG. 1B.

Figure 3:
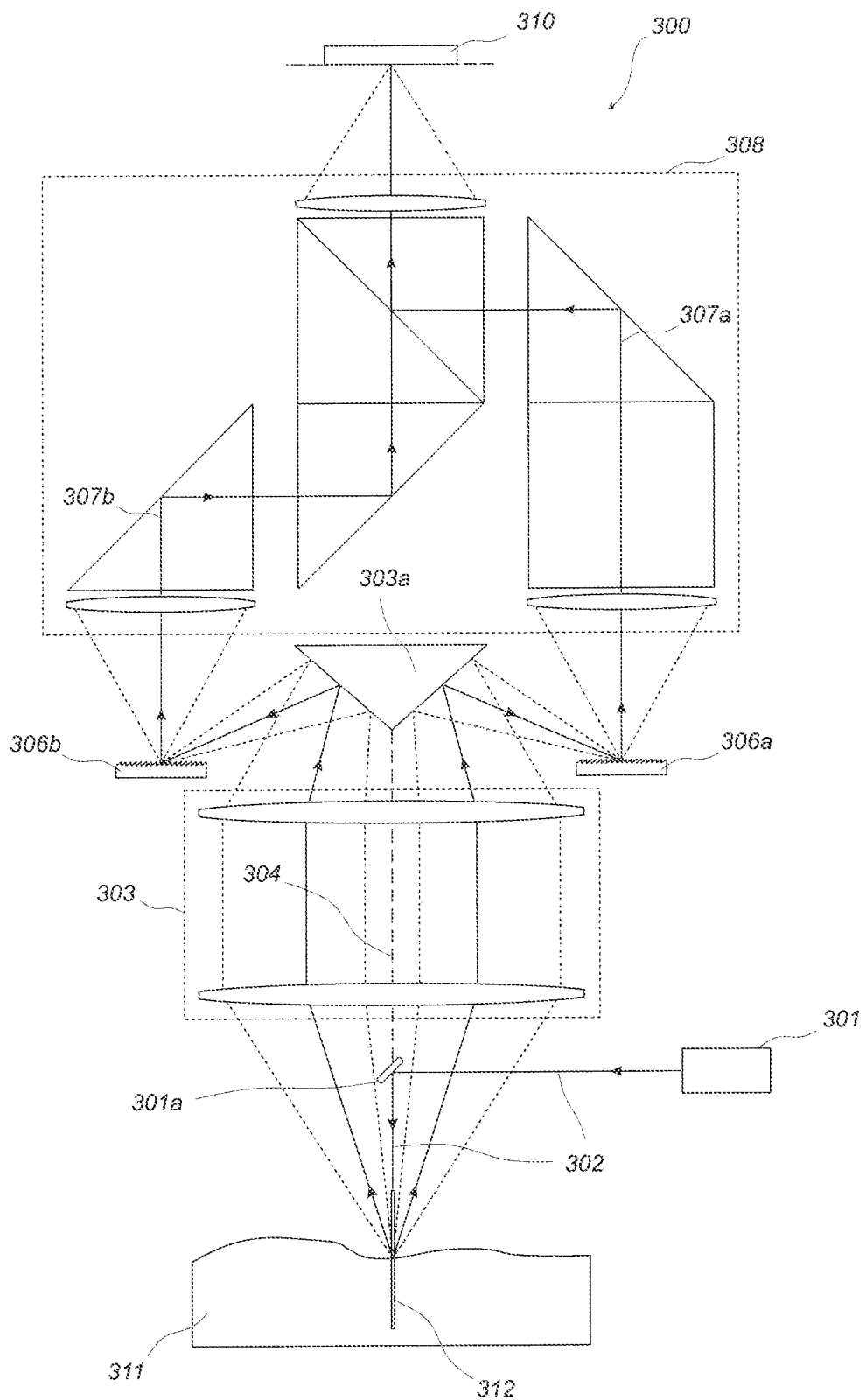
FIG. 3A schematic drawing of a sensor according to a third embodiment of the invention.
Figure 4:
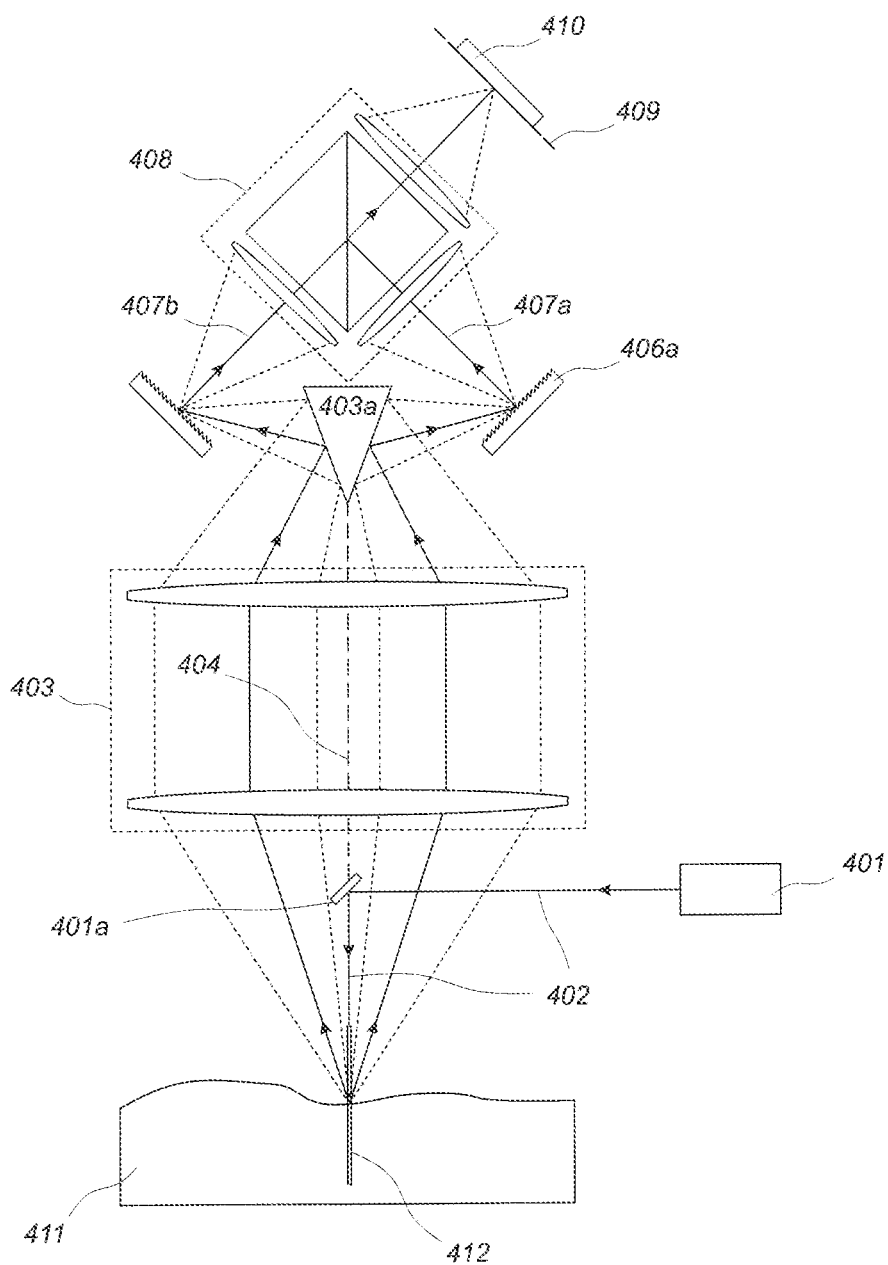
FIG. 4A schematic drawing of a sensor according to a fourth embodiment of the invention.

A reflector 201a may be provided in order to position the light source 201 away from the first measurement axis 204. The reflector 201a may be positioned within the first intermediate optics 203, as shown in FIG. 2, in which case a lens of the first intermediate optics 203 positioned between the reflector 201a and the measurement object 211 may have an opening to allow light from the light source 201 to pass through without being refracted by the lens. Alternatively, the lens may have no opening but instead be shaped to form the light projected in the measurement plane, as shown in FIG. 2. As a further alternative, the reflector 201b may be positioned outside of the first intermediate optics 203, for example between the first intermediate optics 203 and the measurement object 211, as shown in FIGS. 3 and 4. The position and orientation of the light source 201 and reflector 201b may be chosen arbitrarily as long as measurement light is still projected within the measurement plane 212. Since the reflector 201b can be much smaller in size than the light source 201, it can be placed mostly or entirely within the blind spot of the sensor 200, which is aligned with the measurement plane 212 and the projection axis 202.

Measurement light projected onto the measurement object 211 in the measurement plane 212 is scattered (i.e. diffusely reflected) from the surface of the measurement object. At least part of the reflected light is reflected back towards the sensor 200 and in particular towards the first intermediate optics 203. The first intermediate optics 203 lies on the first measurement axis 204, which is aligned with the measurement plane.

Measurement light entering the first measurement optics 203 is focused onto an intermediate image plane 205, which is aligned with the measurement plane 212. As measurement light is reflected from the measurement object 211 at different heights within the measurement plane, i.e. at points closer to or further away from the first intermediate optics 203, the corresponding position of the focused light within the intermediate image plane 205 changes accordingly. Light is focused onto the intermediate image plane 205 from both side of the plane.

A diffraction grating 206 is aligned with the intermediate image plane 205 such that the focused image of the projected light is incident upon the planar surface of the diffraction grating 206, i.e. the planar surface of the diffraction grating 206 is aligned with the intermediate image plane 205. Measurement light reflected from the measurement object 211 and diffracted by the diffraction grating 206 is diffracted along a second measurement axis 207 which is essentially perpendicular to the intermediate image plane 205.

The diffraction grating 206 may be a reflective diffraction grating, a transmissive diffraction grating, or may be capable of operating in both reflective and transmissive modes. For example, a diffraction grating capable of operating in both reflective and transmissive modes is a Ronchi ruling. A diffraction grating capable of operating in both reflective and transmissive modes must be sufficiently thin that the light incident on both sides of the grating is not significantly out of focus, and such that light diffracted in the transmissive mode is aligned with light transmitted in the reflective mode. The diffraction grating may therefore have a thickness of 500 μm or less.

Second intermediate optics 208 are positioned along the second measurement axis 207 and are configured to focus the diffracted light from the diffraction grating 206 onto a sensor image plane 209. Since the image of the light projected onto the measurement object 211 is in focus in the intermediate image plane 205, i.e. on the diffraction grating 206, the angle of the sensor image plane 209 relative to the second measurement axis 207 is the same as the angle of the intermediate image plane 205 relative to the second measurement axis 207. A light sensor 210 is positioned such that its surface is aligned with the sensor image plane 209 and the image of the light projected onto the measurement object 211 is in focus across the active surface of light sensor 210. The angle of incidence of light on the light sensor 210 is therefore equal to the angle of diffraction of light from the diffraction grating 206, i.e. the light sensor 210 is positioned essentially perpendicular to the direction of incident light. Again, an essentially zero angle of incidence of measurement light upon the light sensor 210 is optimal, but as explained above any reduction in the angle of incidence of light upon the light sensor 210 compared to the angle of incidence of light upon the diffraction grating 206 results in improved performance of the sensor 200.

When the diffraction grating can operate in both reflective and transmissive modes, the sensor may also include third intermediate optics positioned along a third measurement axis 207b and configured to focus the diffracted light from a second side of diffraction grating 206 onto a second sensor image plane 209b. A second light sensor 210b is positioned such that its surface is aligned with the second sensor image plane 209b and the image of the light projected onto the measurement object 211 is in focus across the active surface of second light sensor 210b as well, in the same manner as described above for the light sensor 210. The third intermediate optics 208b and second light sensor operate in the same way as the second intermediate optics 208 and light sensor 210 but with mirror symmetry about the intermediate image plane 205.

Alternatively, diffraction grating 206 may be a reflective diffraction grating that diffracts light incident on the intermediate image plane 205 from a first side, and a second reflective diffraction grating may be aligned parallel to the diffraction grating 206 in order to diffract light incident on the intermediate image plane 205 from a second side. In this case, the sensor may also include third intermediate optics positioned along a third measurement axis and configured to focus the diffracted light from a second side of diffraction grating 206 onto a second sensor image plane and second light sensor, as described above with respect to a diffraction grating that can operate in both transmissive and reflective modes. The third measurement axis extends from the intermediate image plane 205 coaxially with the second measurement axis 207, i.e. perpendicular to the intermediate image plane 205, and the third intermediate optics and second light sensor operate in the same way as the second intermediate optics 208 and light sensor 210 but with mirror symmetry about the intermediate image plane 205.

It will be appreciated that third intermediate optics 208b and the other elements arranged along third measurement axis 207b are optional features, not necessary for the basic function of the sensor 200.

FIG. 3 is a schematic drawing of a sensor 300 according to a third embodiment of the invention. Like the sensors 100 and 200, the sensor 300 uses diffraction gratings 306a and 306b to enable an essentially zero angle of incidence of measurement light upon the light sensor 310. Like the sensor 200, sensor 300 is a coaxial sensor, i.e. the first measurement axis 304 is coaxial with the projection axis 302, in other words the first measurement axis 304 lies within the measurement plane 312.

The sensor 300 includes a light source 301, which may be the same as described above with respect to FIGS. 1, 1A and 2. The light source 301 may include one or more optical elements, either integrally as part of the light source 301 or arranged along the axis along a projection axis 302 in the path of light emitted from the light source 301 for shaping the light projected onto the measurement object 311. Light emitted from the light source $3\theta_1$ is emitted in a measurement plane 312 and may be emitted across the whole measurement plane 312, leading to a line of light being projected onto the measurement object 311. However, light emitted from the light source 301 in the measurement plane 312 onto the measurement object 311 may take any suitable form of light as described as above with respect to sensors 100 and 200. Furthermore, a reflector 301a may be provided in order to position the light source 301 away from the first measurement axis 304, as described above with respect to sensor 200. Possible positions of the reflector 301a relative to the first intermediate optics 303 and its possible orientations are the same as described above with respect to the reflector 201b and first intermediate optics 203 of sensor 200.

Measurement light projected onto the measurement object 311 in the measurement plane 312 is scattered (i.e. diffusely reflected) from the surface of the measurement object. Part of the reflected light is reflected back towards the sensor 300 and in particular towards the first intermediate optics 303. The first intermediate optics 303 lies on the first measurement axis 304, which is aligned with the measurement plane.

The first intermediate optics 303 also includes a specular reflector 303b, which is aligned with the measurement plane 312 such that measurement light entering the first intermediate optics after being reflected from a first side of the measurement plane 312 is reflected by a first side of the specular reflector 303b, and such that measurement light entering the first intermediate optics after being reflected from a second side of the measurement plane 312 is reflected by a second side of the specular reflector 303b. As shown in FIG. 3, specular reflector 303b may have a triangular prism shape, where one apex of the triangular cross-section is aligned with the measurement plane 312 and the first measurement axis 304. It will be appreciated, however, that multiple specular reflectors 303b may alternatively be used, e.g. a separate reflector may be provided for measurement light from each side of the measurement plane 312. Thus, one or more reflectors 303b are configured to reflect, in a first direction, measurement light reflected from a first side of the measurement plane 312, and to reflect, in a second direction, measurement light reflected from a second side of the measurement plane 312.

Measurement light received by the sensor is therefore split into a "first side" and a "second side" based on the side of the measurement plane 312 on which it was reflected from the surface of the measurement object 311. On the first side, measurement light entering the first measurement optics 303, 303a after being reflected from the measurement object 311 on the first side of the measurement plane is focused onto a first intermediate image plane 305a. On the second side, measurement light entering the first measurement optics 303, 303a after being reflected from the measurement object 311 on the second side of the measurement plane is focused onto a second intermediate image plane 305b.

On the first side, first diffraction grating 306a is aligned with the first intermediate image plane 305a such that the focused image of the projected light is incident upon the planar surface of the first diffraction grating 306a, i.e. the planar surface of the first diffraction grating 306a is aligned with the first intermediate image plane 305a. Measurement light reflected from the measurement object 311 and diffracted by the first diffraction grating 306a is diffracted along a second measurement axis 307a which is essentially perpendicular to the first intermediate image plane 305a. On the second side, second diffraction grating 306b is aligned with the second intermediate image plane 305b such that the focused image of the projected light is incident upon the planar surface of the second diffraction grating 306b, i.e. the planar surface of the second diffraction grating 306b is aligned with the second intermediate image plane 305b. Measurement light reflected from the measurement object 311 and diffracted by the second diffraction grating 306b is diffracted along a third measurement axis 307b which is essentially perpendicular to the second intermediate image plane 305b. The first and second diffraction gratings 306a, 306b are preferably reflective diffraction gratings.

Second intermediate optics 308 are positioned along the second measurement axis 307a, 307b and combine measurement light diffracted from the first diffraction grating 306a and measurement light diffracted from the second diffraction grating 306b in a combined measurement axis 307, while focusing the diffracted light onto a sensor image plane 309.

The second intermediate optics 308 may therefore include one or more reflectors and a beam combiner, as shown in FIG. 3. Preferably, the optical path length between the measurement object 311 and the sensor image plane 309 on the first side is equal to the optical path length between the measurement object 311 and the sensor image plane 309 on the second side so that the light received at the sensor 310, which is aligned with the sensor image plane 309 from each side at any given point of time corresponds to the same position on the surface of the measurement object 311. Different path lengths may be used but this may complicate the calculation as light received at the same time from each side will not correspond to exactly the same point of measurement on the measurement object 311. Within these bounds, any suitable configuration of the second intermediate optics 308, 308b may be used with the present invention. Indeed, for this reason too, the arrangement of the first intermediate optics 303, 303a and first and second diffraction gratings 306a, 306b is preferably symmetrical with mirror symmetry about the measurement plane 312. Furthermore, the first diffraction grating and second diffraction grating may have the same ruling pitch such that the angles of diffraction of each grating are the same, in which case both gratings 306a, 306b use the same order diffraction mode, e.g. both use the m=1 diffraction mode, both use the m=−1 diffraction mode, or one uses the m=1 diffraction mode and the other uses the m=−1 diffraction mode.

In the sensor 300 depicted in FIG. 3, the first diffraction grating 306a and second diffraction grating 306b are aligned such that their planar diffraction surfaces are oriented perpendicularly to the measurement plane 312 ad parallel to one another to enable the use of 90 degree reflections in the second intermediate optics 308a; however, it will be appreciated that other angles and configurations may be used as long as the optical path length remains the same, for example as shown in FIG. 4.

A light sensor 310 is positioned such that its surface is aligned with the sensor image plane 309 and the diffracted measurement light is in focus on the light sensor 310. As for the sensors 100 and 200, the average angle of incidence of light on the light sensor 310 is decreased compared to the average angle of incidence of measurement light on the diffraction gratings 106. Preferably, the normal vector of the light sensor, which is defined as a vector extending perpendicularly from the planar surface of the light sensor, is aligned with the angle of incidence of light incident on the light sensor 310.

Preferably, the light diffracted from the first diffraction grating 306a is incident on a first portion of the light sensor 310 and light diffracted from the second diffraction grating 306b is incident on a second portion of the light sensor 310. The first portion of the light sensor and second portion of the light sensor are preferably non-overlapping and may be each be, for example, half of the surface of the light sensor 310. This arrangement is naturally achieved in the configuration shown in FIG. 3. As a result, the measurement light received from each side of the measurement plane 312 can be easily distinguished in the output signal of the light sensor 310. Alternatively, the light sensor 310 may be replaced by two separate light sensors, each of which is sized and positioned such that light diffracted from the corresponding diffraction grating is incident upon it.

FIG. 4 is a schematic drawing of a sensor 400 according to a seventh embodiment of the invention. The embodiment of FIG. 4 corresponds to that of FIG. 3 with a different configuration of the second intermediate optics 408, 408a. A single beam combiner 408a is used instead of the arrangement of reflectors and the beams combiner shown in FIG. 3. To enable this configuration, the angle of the reflector 403a of the first intermediate optics and the angles of the first diffraction grating 406a and second diffraction grating 406b are adjusted compared to the corresponding components of sensor 300. As with sensor 300, the second intermediate optics combines measurement light diffracted from each diffraction grating and focuses the measurement light in the sensor image plane 409 and onto the light sensor 410 where the shape can be measured in order to determine the profile of the measurement object.

Any of the sensors described above may be used in a three-dimensional sensor for measuring the three-dimensional shape of the measurement object. By imaging the measurement light projected onto the measurement object at multiple positions on the measurement object, a three-dimensional model of the measurement object can be constructed. In practice, displacement measurements are repeatedly or continuously made as the measurement object moves through the measurement plane, which may be achieved either by moving the sensor relative to a stationary measurement object, or by moving the measurement object relative to the sensor, e.g. on a conveyor belt. Each measurement can be seen as measuring the profile of a cross-sectional slice of the measurement object, and the three-dimensional shape of the measurement object can be reconstructed from these profile measurements by combining them with the known displacement between each measurement.

The sensors may also be used also for multilayer measurement, for example for measuring thicknesses of transparent films. Reflection of the measurement light from the surface of each layer of the transparent film produces a distinguishable intensity peak, and when the refractive indices of the layers are known, the thickness can be calculated based on the distance between two subsequent peaks.

Furthermore, where the light sensor is an image sensor such as a CCD or APS, the light sensors may also capture conventional 2D images of the surface of the measurement object while simultaneously measuring the displacement as described above.

The invention claimed is:

1. A sensor for measuring displacement of a surface of a measurement object relative to the sensor, the sensor comprising:
 a light source configured to project measurement light in a measurement plane such that, when the sensor is in use, measurement light is reflected from the surface of the measurement object at an intersection of the surface of the measurement object with the measurement plane;
 first intermediate optics positioned along a first measurement axis and configured to focus the measurement light reflected on a first side of the measurement plane in an intermediate image plane;
 at least one diffraction grating aligned with the intermediate image plane such that the reflected measurement light is in focus on and incident upon a surface of the diffraction grating, and such that the measurement light is diffracted along a second measurement axis;
 second intermediate optics positioned along the second measurement axis and configured to focus the diffracted measurement light in a sensor image plane; and
 a light sensor aligned with the sensor image plane such that the diffracted measurement light is in focus on the light sensor, wherein the light sensor is configured to measure the diffracted measurement light incident on the light sensor.

2. The sensor of claim 1, wherein the measurement plane is defined by an intersection of a plane of focus of the intermediate image plane via the first intermediate optics and a volume over which the measurement light is projected along the measurement axes.

3. The sensor of claim 1, further comprising third intermediate optics positioned along a third measurement axis and configured to focus the measurement light reflected on a second side of the measurement plane in the intermediate image plane.

4. The sensor of claim 3, wherein the plane of focus of the intermediate image plane via the third intermediate optics is coplanar and overlapping the plane of focus of the intermediate image plane via the first intermediate optics.

5. The sensor of claim 3, wherein the measurement light reflection on the first side of the measurement plane is incident on a first portion of the diffraction grating, and wherein the measurement light reflected on the second side of the measurement plane is incident on a second portion of the diffraction grating.

6. The sensor of claim 4, wherein light diffracted from the first portion of the diffraction grating is focused on a first portion of the light sensor, and wherein light diffracted from the second portion of the diffraction grating is focused on a second portion of the light sensor.

7. The sensor of claim 1, wherein the first measurement axis is offset from the projection axis by a first triangulation angle, and the third measurement axis is offset from the projection axis by a second triangulation angle.

8. The sensor of claim 1, wherein:
the first intermediate optics comprises a first subset, a first specular reflector, and a second subset, wherein the measurement light is configured to be reflected on the first side of the measurement plane, to enter the first subset of the first intermediate optics, to exit the first subset first intermediate optics, to be reflected by the first specular reflector at a first angle of reflection, to enter the second subset first intermediate optics, and further configured to exit the second subset first intermediate optics to cause the measurement light be in focus in the intermediate image plane; and
the third intermediate optics comprises a first subset, a second specular reflector, and a second subset, wherein the measurement light is configured to be reflected on the second side of the measurement plane, to enter the first subset of the third intermediate optics, to exit the first subset of the third intermediate optics, to be reflected by the second specular reflector at a second angle of reflection, to enter the second subset of the third intermediate optics, and further configured to exit the second subset of the third intermediate optics to cause the measurement light be in focus in the intermediate image plane.

9. The sensor of claim 1, wherein the first intermediate optics and third intermediate optics are arranged with mirror symmetry about the measurement plane.

10. The sensor of claim 1, wherein the diffraction grating is a curved diffraction grating, and wherein the curvature of the diffraction grating is the same as a curvature of the intermediate image plane.

11. The sensor of claim 1, wherein the sensor is configured to identify multiple local light intensity maxima on the light sensor, each local light intensity maximum corresponding to the reflection of measurement light from a transparent layer of the measurement object, and calculate the distance to the each transparent layer of the measurement object based on the locations of local light intensity maxima.

12. A sensor for measuring the displacement of the surface of a measurement object relative to the sensor, the sensor comprising:
a light source configured to project measurement light along a projection axis and in a measurement plane such that, when the sensor is in use, measurement light is reflected from the surface of the measurement object at the intersection of the surface of the measurement object with the measurement plane;
first intermediate optics positioned along a first measurement axis and configured to focus the measurement light reflected from the measurement plane in an intermediate image plane, wherein the first measurement axis is coaxial with the projection axis;
a diffraction grating aligned with the intermediate image plane such that the reflected measurement light is in focus on and incident upon a surface of the diffraction grating, and such that the measurement light is diffracted along a second measurement axis;
second intermediate optics positioned along the second measurement axis and configured to focus the diffracted measurement light in a sensor image plane; and
a light sensor aligned with the sensor image plane such that the diffracted measurement light is in focus on the light sensor, wherein the light sensor is configured to measure the diffracted measurement light incident on the light sensor.

13. The sensor of claim 12, wherein an angle of diffraction of each ray of measurement light from the diffraction grating is smaller than an angle of incidence of said each ray of measurement light on the diffraction grating.

14. The sensor of claim 12, wherein the diffraction grating is coplanar with the measurement plane.

15. The sensor of claim 14, wherein the diffraction grating is configured to operate in both reflective and transmissive modes.

16. The sensor of claim 15, wherein a thickness of the diffraction grating is less than 500 µm.

17. The sensor of claim 12, wherein the diffraction grating is further configured to diffract the measurement light along a third measurement axis, the third measurement axis being coaxial with the second measurement axis and extending from a side of the diffraction grating opposite to the second measurement axis, and wherein sensor further comprises:
third intermediate optics positioned along the third measurement axis and configured to focus the diffracted measurement light in a second sensor image plane; and
a second light sensor aligned with the second sensor image plane such that diffracted measurement light is in focus on the second light sensor, wherein the second light sensor is configured to measure the diffracted measurement light incident on the sensor light sensor.

18. The sensor of claim 12, wherein the sensor further comprises:
a second diffraction grating positioned such that the first diffraction grating and second diffraction grating are mirror symmetric about the measurement plane; and
at least one reflector configured to reflect measurement light from a first side of the measurement plane onto the first diffraction grating and to reflect measurement light from a second side of the measurement plane onto the second diffraction grating,
wherein the second intermediate optics is configured to focus the light diffracted from the first diffraction grating and light diffracted from the second diffraction grating in the sensor image plane.

19. The sensor of claim 18, wherein an optical path length between the measurement plane and the light sensor for the measurement light from the first side of the measurement plane is the same as an optical path length between the measurement plane and the light sensor for the measurement light from the second side of the measurement plane.

20. The sensor of claim 18, wherein the second intermediate optics further comprises a beam combiner configured to combine measurement light from the first side of the measurement plane and measurement light from the second side of the measurement plane such that measurement light from both sides of the measurement plane is incident on the light sensor.

\* \* \* \* \*